(12) United States Patent
Wilkens

(10) Patent No.: US 7,510,072 B1
(45) Date of Patent: Mar. 31, 2009

(54) CONVEYOR FLOOR SLAT AND SEALS

(76) Inventor: Arthur L. Wilkens, 820 N. 5th, Stockton, KS (US) 67669

(*) Notice: Subject to any disclaimer, the term of this patent is extended or adjusted under 35 U.S.C. 154(b) by 25 days.

(21) Appl. No.: 11/735,485

(22) Filed: Apr. 15, 2007

Related U.S. Application Data

(60) Provisional application No. 60/792,033, filed on Apr. 15, 2006.

(51) Int. Cl.
*B65G 25/00* (2006.01)
(52) U.S. Cl. .............. 198/750.3; 198/750.4; 414/525.9
(58) Field of Classification Search .............. 198/450.3, 198/750.4; 414/525.9
See application file for complete search history.

(56) References Cited

U.S. PATENT DOCUMENTS

| | | | |
|---|---|---|---|
| 5,301,798 A | | 4/1994 | Wilkens |
| 5,303,816 A | * | 4/1994 | Foster ..................... 198/750.3 |
| 5,335,778 A | | 8/1994 | Wilkens |
| 5,655,645 A | * | 8/1997 | Foster ..................... 198/750.3 |
| 5,727,672 A | | 3/1998 | Foster |
| 5,806,660 A | * | 9/1998 | Foster ..................... 198/750.3 |
| 6,013,585 A | | 1/2000 | Foster et al. |
| 6,651,806 B2 | * | 11/2003 | Hallstrom ................ 198/750.3 |
| 6,763,933 B1 | | 7/2004 | Wilkens |
| 6,942,089 B2 | | 9/2005 | Quaeck |
| 7,104,393 B1 | | 9/2006 | Wilkens |
| 7,152,729 B2 | | 12/2006 | Wilkens et al. |

* cited by examiner

*Primary Examiner*—Mark A Deuble
(74) *Attorney, Agent, or Firm*—Farris Law, P.C.; Robert L. Farris

(57) ABSTRACT

The conveyor floor slat is an extruded translucent UHMW polyethylene member with a top plate and two side walls. The top plate has an upwardly facing cargo support surface and a downwardly facing bearing surface between the two side walls. A support and hold down flange with a downwardly facing horizontal support surface and an upwardly facing horizontal hold down surface is integral with the bottom edge of each side wall. The UHMW polyethylene can be formed by extrusion, reduces slat weight and requires less force to reciprocate back and forth to discharge cargo than expected. A rubber like seal can be mounted in a seal holder on the outboard side of one sidewall. A seal contact flange is integral with the outboard side of the other side wall.

3 Claims, 4 Drawing Sheets

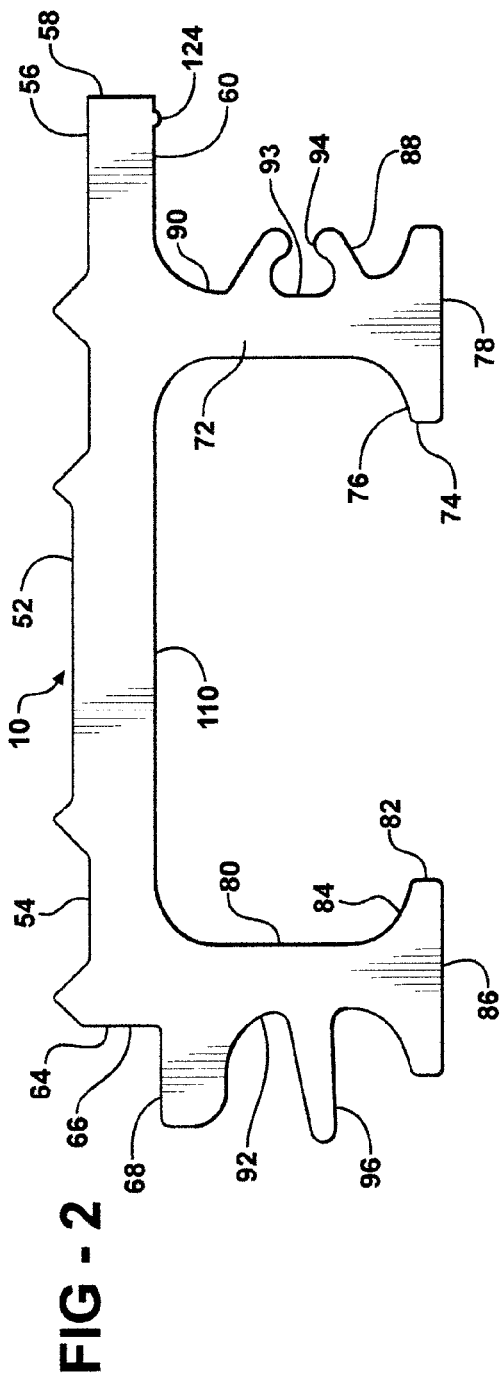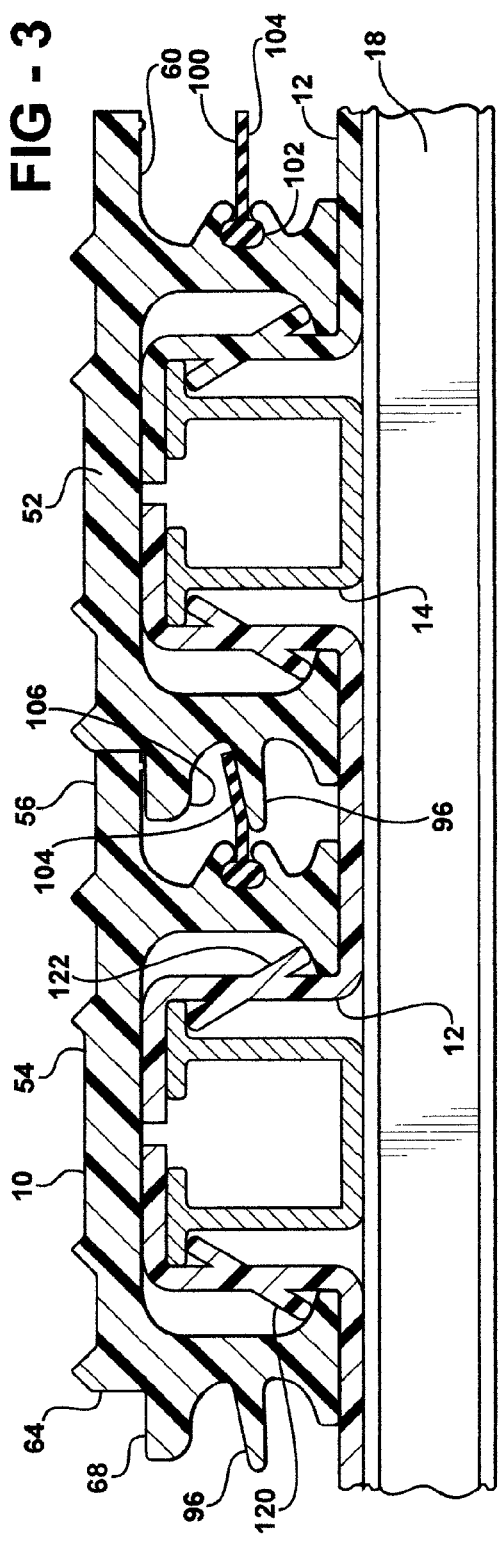

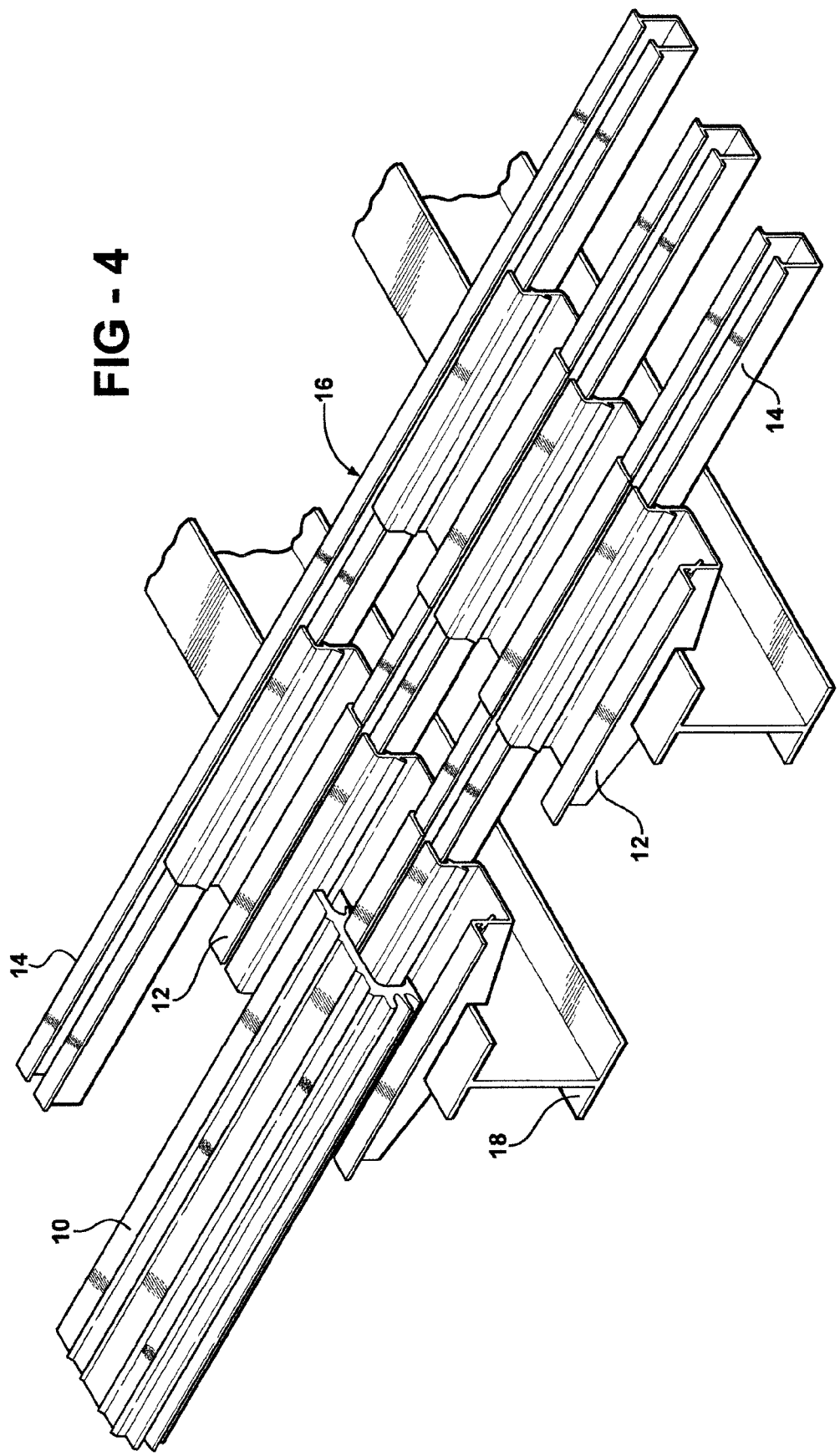

CONVEYOR FLOOR SLAT AND SEALS

CROSS REFERENCE TO RELATED APPLICATION

This application claims the benefit of the filing date of U.S. Provisional Application No. 60/792,033 titled CONVEYOR FLOOR SLAT AND SEALS. Filed Apr. 15, 2006.

TECHNICAL FIELD

The invention relates to a polyethylene floor slat for a reciprocating floor slat conveyor in a container for transporting bulk material including edibles and protecting the cargo and environment from pathogens and the elements.

BACKGROUND OF THE INVENTION

Reciprocating slat floor conveyors are used in van bodies and semi trailers and other cargo containers with open tops for transporting a variety of bulk cargos. The open tops facilitate loading. The vehicles equipped with floor conveyors, transport cargo to cargo receiving areas. The reciprocating floor conveyors unload the cargo in the receiving area. The reciprocating slat floor conveyors work well for unloading bulk cargo such as wood chips saw dust, silage, grain and fodder that has been ground, rolled or formed into pellets for livestock feed. Food products for human consumption are also transported and unloaded. Reciprocating slat floor conveyors are also used for transporting and unloading caustic materials such as sewage sludge and poultry litter.

Reciprocating slat floor conveyor floor slats are usually extruded aluminum members that are generally three to six inches wide and may be over fifty feet long. Each floor slat is supported by and slides on a plurality of molded plastic slide bearings. One bearing that can be used is disclosed in U.S. Pat. No. 7,104,393, the disclosure of which is incorporated herein by reference. The aluminum floor slats work well in most conditions. Aluminum slats also slide well on molded plastic slide bearings. With an adequate sub floor, aluminum floor slats can support pallets with cargo and fork lift trucks employed to load and unload pallets. The rate of wear of aluminum is acceptable if the slats do not make sliding contact with each other. Sliding contact between aluminum members may result in galling and premature slat destruction.

Caustic materials such as sewage sludge and poultry litter reduce the useful life of aluminum floor slats to an unacceptable short time period. To overcome the problem, polyvinyl chloride (PVC) floor slats were developed. PVC does not react with caustic materials such as poultry litter. PVC also eliminates the galling problem. Vertical edge surfaces of two adjacent floor slats can therefore be in sliding contact with each other and thereby create a seal that prevents cargo loss. PVC floor slats are in use today for transporting and conveying caustic cargo. Floor slats made from plastic and fiber reinforcements have also been produced. These slats are generally relatively expensive and add weight.

Cargo contamination is a concern with cargo containers having reciprocating slat floor conveyors. The contamination can be caused by loss of contaminated cargo that is being transported, through worn or damaged conveyor floor slat seals. Any loss of contaminated grain that can spread to and contaminate additional grain fields is to be avoided. Contamination can also be caused by pathogens entering the cargo container through slat seals. Air borne contaminants that can enter or escape from grain in a cargo compartment are of concern because of their ability to be widely spread in the atmosphere by wind.

A fixed solid sub floor conveyor can eliminate the loss of cargo and the contamination of cargo by toxic substances passing through an undamaged container floor. Sub floors have been made from plastic materials as well as metals such as aluminum. Unfortunately, a solid sub floor under the reciprocating floor conveyor increases the cargo container empty weight and decreases the weight of cargo that can be transported under gross weight limit laws. A cargo container that is a few hundred pounds lighter can reduce operating costs and increase income significantly during the working life of a trailer.

The hydraulic systems employed to reciprocate floor slats are required to provide sufficient force to move each set of floor slats under the highest load conditions. Friction loads between floor slats and floor slat support bearings, between each floor slat and adjacent floor slats, between floor slats and cargo, and between cargo and the cargo container walls are all factors that determine the size and weight of hydraulic system components. Safety considerations when employing fluids under pressure also require consideration. Reduction of the hydraulic fluid pressure required to operate a reciprocating floor slat conveyor will reduce the required size and weight of the drive system and increase the weight of the cargo that can be transported at any given time.

SUMMARY OF THE INVENTION

The reciprocating floor conveyor for a cargo container includes a sub-floor. The sub-floor includes a plurality of spaced apart cross beams. A plurality of parallel spaced apart guide beams are transverse to the CROSS beams and secured to the cross beams. A plurality of reciprocating floor conveyor bearings with floor slat support surfaces and floor slat hold down flanges are mounted on the guide beams. A reciprocating floor conveyor drive includes a plurality of driven floor slat connectors. A plurality of extruded UHMW floor slats are slidably mounted on the plurality of reciprocating floor conveyor bearings for reciprocating movement parallel to the plurality of parallel spaced apart guide beams. Each floor slat is attached to and driven by one of the plurality of driven floor slat connectors.

Each extruded UHMW floor slat includes a top plate with an upwardly facing cargo support surface and a bearing surface that faces downward. A first side wall extends downward from the top plate at one side of the bearing surface. A second side wall extends downward from the top plate at another side of the bearing surface. A first support and hold down flange is integral with the first side wall and has a downwardly facing horizontal support surface that extends substantially from a slat front end to a slat rear end. An upwardly facing horizontal hold down surface is provided on the first support and hold down flange. A second support and hold down flange is integral with the second side wall and has a downwardly facing horizontal support surface that extends substantially from the slat front end to the slat rear end. An upwardly Facing horizontal hold down surface is provided on the second support and hold flange.

A first side cantilevered lip is integral with the top plate. The lip has a first side vertical sealing and bearing surface and a first side downwardly facing sealing and bearing surface extending from the first side vertical sealing and bearing surface to an outboard side of the first side wall. A second side recess in the top plate includes a second side vertical sealing and bearing surface that extends downward from the upwardly facing cargo support surface. An upwardly facing horizontal sealing and bearing surface extends outward from a bottom edge of the second vertical sealing and bearing surface and away from an outboard side of the second side wall.

A seal holder flange is integral with an outboard side of the first side wall below the first side downwardly facing sealing and bearing surface. The seal holder flange includes a seal base receiver passage and a seal blade passage. A floor slat seal has a seal base and a seal blade. The seal base is received in the seal base receiver passage. The seal blade extends through the seal blade passage and extends laterally outward away from the outboard side of the first side wall. A seal contact flange, with an upwardly facing seal contact surface, is integral with the second side wall and extends laterally outward from the outboard side of the second side wall.

The cantilevered lip on the top plate is received in the second side recess in the top plate of an adjacent floor slat in a floor conveyor.

The seal holder flange can be integral with the second side wall if desired. When the seal holder flange is integral with the second side wall, the seal blade extends laterally outward away from the outboard side of the second side wall. The seal contact flange is integral with the first side wall when the seal holder flange is part of the second side wall. When the seal contact flange is mounted on the first side wall, the seal contact surface on the seal contact flange may face upwardly to facilitate assembly of the floor conveyor.

BRIEF DESCRIPTION OF THE DRAWINGS

The presently preferred embodiment of the invention is disclosed in the following description and in the accompanying drawings, wherein:

FIG. 2 is an enlarged end view of a conveyor floor slat with a secondary seal;

FIG. 3 is a sectional view taken along line 3-3 in FIG. 1 of two floor slats and their seals;

FIG. 4 is an enlarged perspective view showing a conveyor floor construction with parts removed and parts broken away.

DETAILED DESCRIPTION OF THE PREFERRED EMBODIMENTS

Figure 1:
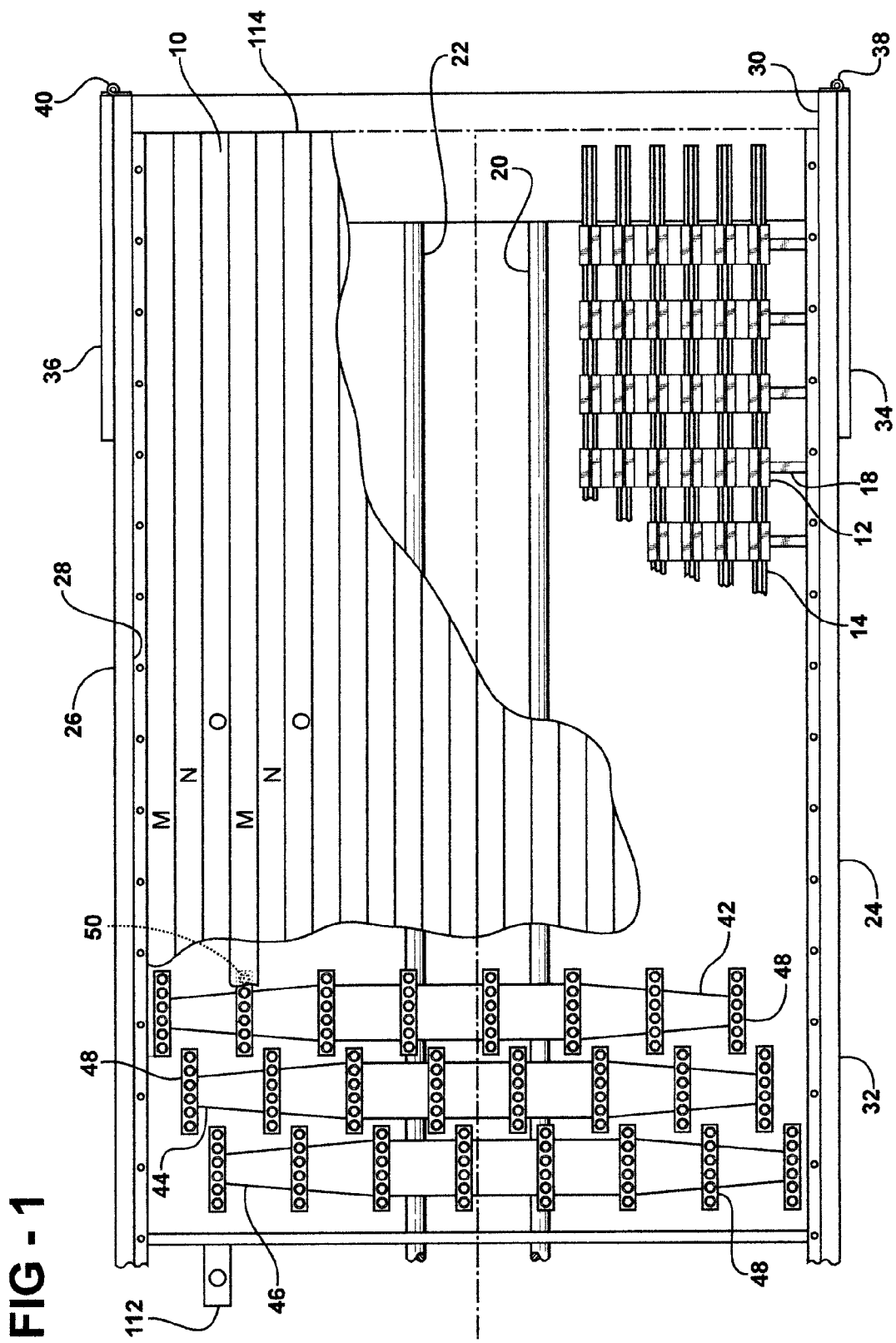
FIG. 1 is a plan view of a portion of a reciprocating floor conveyor in a semi trailer with parts removed and other parts broken away to show a typical conveyor construction.
Figure 5:
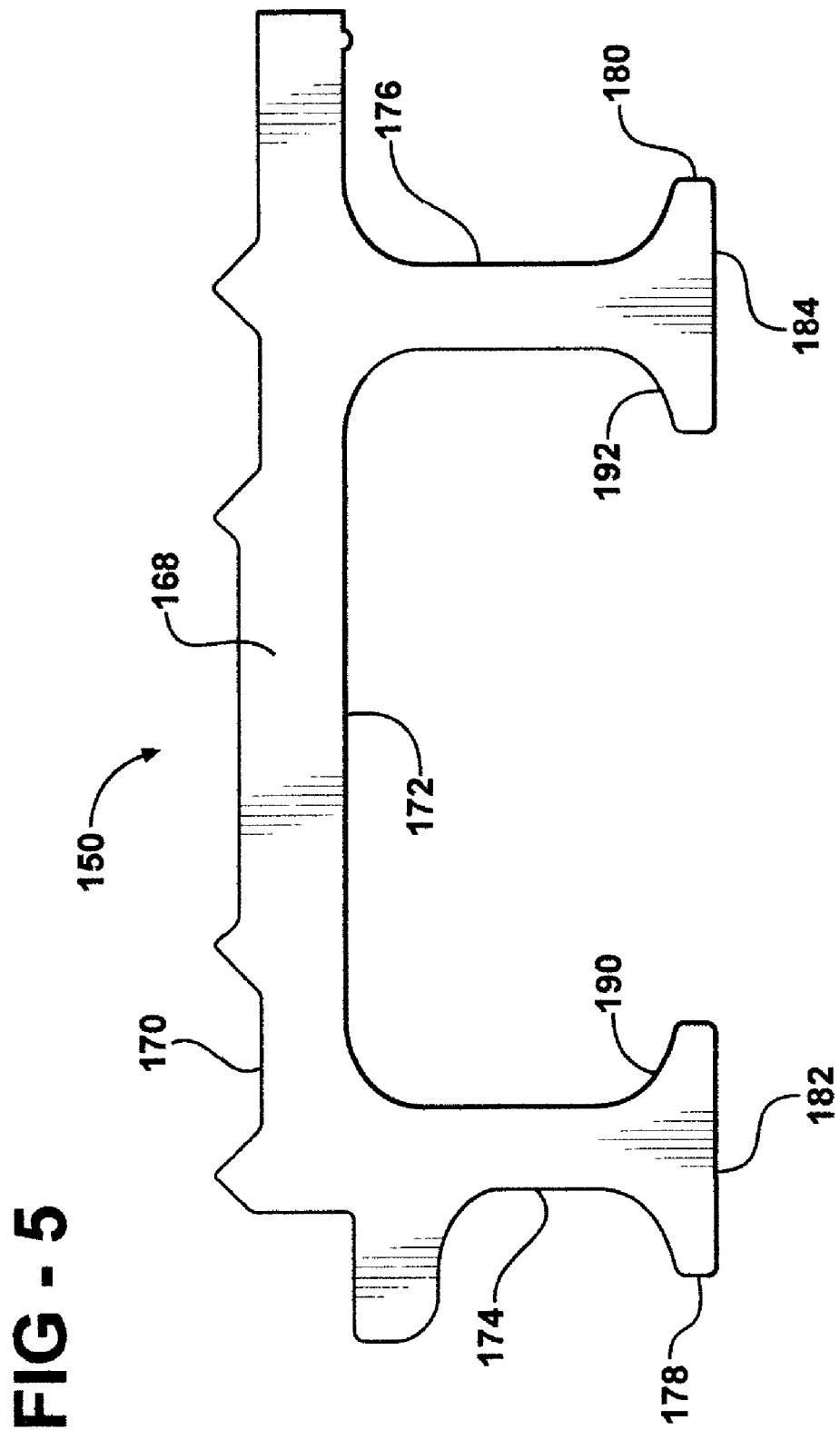
FIG. 5 is an enlarged end view of a floor slat with primary seals only.

Each conveyor floor slat 10 is slidably mounted on a plurality of reciprocating floor conveyor bearings 12. The bearings 12 are preferably a molded plastic such as ultra high molecular weight (UHMW) plastic. The bearing shown in applicant's U.S. Pat. No. 7,104,393 issued Sep. 12, 2006 would be a satisfactory bearing.

The conveyor bearings 12 are mounted on the guide beams 14 of a reciprocating floor conveyor sub-floor assembly 16. The guide beams 14 are fixed to cross beams 18. The cross beams 18 are aluminum I-beams. However, the cross beams 18 could also be tubes or channels and may be steel rather than aluminum. The guide beams 14 may be tubes with a square or rectangular cross section. The guide beams 14 can also have a u-shaped cross-section as shown in FIG. 3.

The cross beams 18 of the sub floor assembly 16 are fixed to two trailer fore and aft extending main frame members 20 and 22. Cargo container side walls 24 and 26 are fixed to the ends of the cross beams 18. The inside surfaces 28, of the container side walls 24 and 26, are vertical, flat and smooth. Aluminum, steel and fiber glass reinforced plywood (FRP) may be used to construct the walls 24 and 26. A discharge opening 30 at the rear of the cargo container 32 is closed by doors 34 and 36 when the container 32 is ready to be loaded. The doors 34 and 36 are pivotally attached to the walls 24 and 26 by hinges 38 and 40 respectively.

The reciprocating floor conveyor bearings 12 may be designed to mount on the guide beams 14 between two cross beams 18. Other bearings 12 are designed to mount on the guide beams and simultaneously straddle one cross-beam 18 as shown in FIGS. 1 and 4.

Transverse drive beams 42, 44 and 46 are positioned under the floor slats. Floor slat connectors 48 are secured to each of the drive beams. Bolts 50 clamp each M floor slat 10 to a connector 48 on the drive beam 42. Bolts 50 clamp each N floor slat 10 on the left side of each M floor slat to the connectors 48 on the drive beam 44. Bolts 50 clamp each O floor slat 10 in a space to the left of each N floor slat, to the connectors 48 on the drive beam 46. A hydraulic drive system, such as the drive system disclosed in U.S. Pat. No. 5,839,568 to Clark reciprocates the drive beams 42, 44 and 46 back and forth to advance cargo through the discharge opening 30. The hydraulic drive system first moves all three drive beams 42, 44, and 46, the attached floor slats 10 and cargo supported by the floor slats toward the discharge opening 30. The floor slats 10 and the cargo moves around twelve inches to the rear together each cycle. The drive beam 46 and the attached O floor slats 10 then move forward and away from the discharge opening 30 while the M and N floor slats and the cargo remain stationary. After the O floor slats finish their forward movement, the N floor slats 10 connected to the drive beam 44 move forward while the M and O floor slats 10 remain stationary together with the cargo. After the N floor slats reach their forward limit of travel, the M floor slats 10 connected to the drive beam 42 move forward while the N and O floor slats 10 remain stationary together with the cargo. After the O, N and M floor slats reach their forward limit of travel together with the drive beam 42, 44 and 46, the drive system is ready to repeat the cycle and move the cargo rearward another step of about 12 inches. The operation continues until all the cargo is discharged.

Each floor slat 10 is extruded from a UHMW DURA plastic or a UHMW plastic with similar properties. UHMW is ultra high molecular weight polyethylene. In the past, polyethylene has been used to form films and sheets for packaging. Polyethylene has also been molded to form containers, kitchen wares and tubing. Recently slide bearings have also been molded from UHMW as mentioned above and sold under the name ALATHON®.

The UHMW floor slats 10 have a top plate 52 with an upwardly facing cargo support surface 54. The top plate 52 has a first side cantilevered lip 56 that extends the length of the floor slat 10. The lip 56 has a first side vertical upper sealing and bearing surface 58 and a first side downwardly facing sealing and bearing surface 60. The top plate 52 has a second side recess 64 extending the length of the floor slat 10 that receives the lip 56 of an adjacent floor slat. The recess 64 includes a second side vertical upper sealing and bearing surface 66. An upwardly facing horizontal sealing and bearing surface 68 extends horizontally outward from the second side vertical upper sealing and bearing surface 66.

A first sidewall 72 extends downward from the top plate 52 adjacent to the downwardly facing horizontal sealing and bearing surface 60. A first support and hold down flange 74, is integral with the bottom of the first side wall 72 and extends horizontally parallel to the horizontal first side sealing and bearing surface 60. The first side wall 72 and the support and hold down flange 74 both extend the length of the floor slat 10. The first support and hold down flange 74 includes an upwardly facing horizontal hold down surface 76. The first support and hold down flange 74 also includes a downwardly facing horizontal support surface 78.

A second sidewall 80 extends downward from the top plate 52 adjacent to the second side vertical sealing and bearing surface 66. A second support and hold down flange 82, is integral with the bottom of the second side wall 80 and extends horizontally parallel to the second side horizontal sealing and bearing surface 68. The second side wall 80 and the second support and hold down flange 82 both extend the length of the floor slat 10. The second support and hold down flange 82 includes an upwardly facing horizontal hold down surface 84. The second support and hold down flange 82 also includes a downwardly facing horizontal support surface 86.

A seal holder flange 88 is integral with an outboard side 90 of the first side wall 72. The seal holder flange 88 includes a seal base receiver passage 93 that extends the length of the floor slat 10. A seal blade passage 94 passes through an outboard side of the seal holder flange 88. A seal contact flange 96 is integral with an outboard side 92 of the second side wall 80 of the floor slat 10 and extends the length of a floor slat 10.

A seal 100 has a base 102 that is received in the seal base receiver passage 93. A blade 104 of the seal 100 extends outward through the seal blade passage 94. A free end of the blade 104 contacts the seal contact flange 96 on an adjacent floor slat 10. The blade 104 of the seal 100 slides on the seal contact flange 96 when two adjacent floor slats 10 move relative to each other. The blade 104 of the seal 100 is vertically mid way between the top plate 52 of the floor slat 10 and the support and hold down flanges 74 and 82. This position of the seal 100 creates a substantial air volume chamber 106 below the first side downwardly facing sealing and bearing surface 60 and outboard side 92 of the second side wall 80 on two adjacent floor slats 10. The air in the substantial air volume chamber 106 creates an air dam that substantially prevents the passage of air born pathogens into or out of a cargo compartment 32. The seal 100 also blocks the flow of liquids and liquid born pathogens up between to adjacent floor slats 10 and contaminating cargo supported by the floor slats 10. The seal 100 is substantially as effective as a fixed floor under the conveyor slats 10. A floor conveyor assembly in combination with fixed floor under the conveyor floor slats is several hundred pounds heavier than a floor conveyor assembly with the floor slats 10 and the seals 100 described above. The reduced weight floor conveyor assembly permits a larger cargo weight when the container is loaded and reduces fuel consumption when the container is empty.

A bearing surface 110 is provided on the top plate 52. This bearing surface extends from the first side wall 72 to the second side wall 80 and from a slat front end 112 to a slat rear end 114 of each floor slat 10. Portions of the bearing surface 110 are in sliding engagement with the tops of reciprocating floor conveyor bearings 12.

The floor slat 10, as shown in FIGS. 2 and 3 has the seal 100 on the same side of the floor slat as the cantilevered lip 56. In this location, the blade 104 of the seal 100 moves downward into engagement with the seal contact flange 96 and the cantilevered lip 56, directly above the seal, simultaneously moves downward into the second side recess 64 in an adjacent floor slat 10. During assembly of a floor conveyor, the support and hold flanges 74 and 82 are moved into engagement with the top of slat hold down flanges 120 and 122 on slide bearings 12 and the blade 104 of the seal 100 is positioned under the floor slat protrusion with sealing and bearing surface 68. A vertical downward force is then applied to a floor slat 10 to force the horizontal hold down surfaces 76 and 84 downward and under the hold down flanges 120 and 122 on the bearings 12. The blade 104 of the seal 100 is simultaneously moved downward into engagement with a seal contact flange 96 on an adjacent floor slat 10. A tongue 124 on the first side cantilevered lip 56 engages the upwardly facing horizontal sealing and bearing surface 68 to form a positive seal.

The floor slats 10 can be made with a holder flange 88 integral with the second side wall 80 and the seal contact flange 96 integral with the first side wall 72. During assembly with this arrangement, the seal contact flange 96 is moved between the blade 104 of a seal 100 and a projection with the upwardly facing horizontal sealing and bearing surface 68 on an adjacent floor slat 10. The first support and hold down flange 74 and the second support hold down flange 82 are simultaneously moved into engagement with the slat retainer flanges 120 and 122 on the bearing 12. A vertical force is applied to the floor slat 10 to move the floor slat downward, move the first and second support and flanges 74 and 82 on the floor slat 10 under the slat retainer flanges 120 and 122. The resilient slat retainer flanges 120 and 122 move together to permit the passage of the hold down flanges 74 and 82 and then snap outward into retaining positions. As the floor slat 10 moves downward, the seal contact flange 96 contacts the blade 104 of the seal 100 and forces the seal downward a short distance. The blade 104, in this arrangement, is below the seal contact flange 96 rather than on top of the seal contact flange as shown in FIG. 3. In some conditions the seal 100 position shown in FIG. 3 is preferred. In other conditions it is desirable to have the blade 104 of seal 100 engaging the bottom of the seal contact flange 96.

Floor slats have not been made by extruding UHMW plastic in the past. It was believed that UHMW was too difficult to extrude. It was also believed that polyvinyl chloride floor slats would be superior in some respects and substantially the same in other respects. It has been discovered that UHMW plastic can be extruded successfully with appropriate extrusion dies. It has also been determined that fiber reinforcement of UHMW floor slats is not required for conveying most cargo. UHMW floor slats are significantly lighter weight than aluminum floor slats. PVC floor slats are about the same weight as aluminum floor slats. UHMW floor slats can be damaged by forklift trucks and pallets. Aluminum floor slats are also damaged by pallets and fork lift trucks occasionally.

UHMW plastics are known to have a low coefficient of friction. Comparison tests with floor conveyors employing aluminum floor slats and substantially identical floor conveyors employing UHMW floor slats indicates that the UHMW floor slats exceed expectations. The maximum hydraulic pressure required by a floor conveyor using UHMW floor slats was significantly reduced. The maximum hydraulic pressure using aluminum floor slats was significantly higher than the pressure required with UHMW floor slats. The maximum hydraulic pressure using PVC floor slats was also significantly higher than the pressure required with UHMW floor slats. As a result, the weight of the hydraulic system can be reduced when using extruded UHMW floor slats 10 thereby further increasing the useful load transportable in a vehicle equipped with UHMW floor slats 10.

What is claimed is:

1. A reciprocating floor conveyor floor for a cargo container comprising:
   a sub-floor including a plurality of spaced apart cross beams, a plurality of parallel spaced apart guide beams transverse to and secured to the cross beams, and a plurality of reciprocating floor conveyor bearings each of which has floor slat support surfaces and floor slat hold down flanges mounted on the guide beams;
a reciprocating floor conveyor drive including a plurality of driven floor slat connectors;
a plurality of extruded UHMW floor slats slidably mounted on the plurality of reciprocating floor conveyor bearings for reciprocating movement parallel to the plurality of parallel spaced apart guide beams and driven by the plurality of driven floor slat connectors;
wherein each extruded UHMW floor slat includes a top plate with an upwardly facing cargo support surface, a bearing surface facing downward, a first side wall extending downward from the top plate at one side of the bearing surface, a second side wall extending downward from the top plate at another side of the bearing surface, a first support and hold down flange integral with the first side wall and having a downwardly facing horizontal support surface that extends substantially from a slat front end to a slat rear end, and upwardly facing horizontal hold down surface on the first support and hold down flange, a second support and hold down flange integral with the second side wall and having a downwardly facing horizontal support surface that extends substantially from the slat front end to the slat rear end, an upwardly facing horizontal hold down surface on the second support and hold down flange, a first side cantilevered lip integral with the top plate and including a first side vertical sealing and bearing surface and a first side downwardly facing sealing and bearing surface extending from the first side vertical sealing and bearing surface to an outboard side of the first side wall, a second side recess in the top plate including a second side vertical sealing and bearing surface extending downward from the upwardly facing cargo support surface, and an upwardly facing horizontal sealing and bearing surface extending outward from a bottom edge of the second side vertical sealing and bearing surface and away from an outboard side of the second side wall;
a seal holder flange integral with the outboard side of the first side wall below the first side downwardly facing sealing and bearing surface and including a seal base receiver passage and a seal blade passage;
a floor slat seal having a seal base and a seal blade and wherein the seal base is received in the seal base receiver passage and the seal blade extends through the seal blade passage and laterally outward away from the outboard side of the first side wall; and
a seal contact flange with an upwardly facing seal contact surface integral with the second side wall and extending laterally outward from the outboard side of the second side wall.

2. A reciprocating floor conveyor floor for a cargo container comprising:
a sub-floor including a plurality of spaced apart cross beams, a plurality of parallel spaced apart guide beams transverse to and secured to the cross beams and a plurality of reciprocating floor conveyor bearings each of which has floor slat support surfaces and floor slat hold down flanges mounted on the guide beams;
a reciprocating floor conveyor drive including a plurality of driven floor slat connectors;
a plurality of extruded UHMW floor slats slidably mounted on the plurality of reciprocating floor conveyor bearings for reciprocating movement parallel to the plurality of parallel spaced apart guide beams and driven by the plurality of driven floor slat connectors;
wherein each extruded UHMW floor slat includes a top plate with an upwardly facing cargo support surface, a bearing surface facing downward, a first side wall extending downward from the top plate at one side of the bearing surface, a second side wall extending downward from the top plate at another side of the bearing surface, a first support and hold down flange integral with the first side wall and having a downwardly facing horizontal support surface that extends substantially from a slat front end to a slat rear end, and upwardly facing horizontal hold down surface on the first support and hold down flange a second support and hold down flange integral with the second side wall and having a downwardly facing horizontal support surface that extends substantially from the slat front end to the slat rear end, an upwardly facing horizontal hold down surface on the second support and hold down flange, a first side cantilevered lip integral with the top plate and including a first side vertical sealing and bearing surface and a first side downwardly facing sealing and bearing surface extending from the first side vertical sealing and bearing surface to an outboard side of the first side wall, a second side recess in the top plate including a second side vertical sealing and bearing surface extending downward from the upwardly facing cargo support surface, and an upwardly facing horizontal sealing and bearing surface extending outward from a bottom edge of the second side vertical sealing and bearing surface and away from an outboard side of the second side wall;
a seal holder flange integral with the outboard side of the second side wall and including a seal base receiver passage and a seal blade passage;
a floor slat seal having a seal base and a seal blade and wherein the seal base is received in the seal base receiver passage and the seal blade extends through the seal blade passage and laterally outward away from the outboard side of the second side wall; and
a seal contact flange with a downwardly facing seal contact surface integral with the outboard side of the first side wall below the first side downwardly facing sealing and bearing surface and extending laterally outward from the outboard side of the first side wall.

3. A reciprocating floor conveyor floor for a cargo container comprising:
a sub-floor including a plurality of spaced apart cross beams, a plurality of parallel spaced apart guide beams transverse to and secured to the cross beams, and a plurality of reciprocating floor conveyor bearings each of which has floor slat support surfaces and floor slat hold down flanges mounted on the guide beams;
a reciprocating floor conveyor drive including a plurality of driven floor slat connectors;
a plurality of extruded UHMW floor slats slidably mounted on the plurality of reciprocating floor conveyor bearings for reciprocating movement parallel to the plurality of parallel spaced apart guide beams and driven by the plurality of driven floor slat connectors;
wherein each extruded UHMW floor slat includes a top plate with an upwardly facing cargo support surface, a bearing surface facing downward, a first side wall extending downward from the top plate at one side of the bearing surface, a second side wall extending downward from the top plate at another side of the bearing surface, a first support and hold down flange integral with the first side wall and having a downwardly facing horizontal support surface that extends substantially from a slat front end to a slat rear end, and upwardly facing horizontal hold down surface on the first support and hold down flange, a second support and hold down flange integral with the second side wall and having a downwardly facing horizontal support surface that extends substantially from the slat front end to the slat rear end, an upwardly facing horizontal hold down surface on the second support and hold down flange, a first side cantilevered lip integral with the top plate and including a first side vertical sealing and bearing surface and a first side downwardly facing sealing and bearing surface extending from the first side vertical sealing and bearing surface to an outboard side of the first side wall, a second side recess in the top plate including a second side vertical sealing and bearing surface extending downward from the upwardly facing cargo support surface, and an upwardly facing horizontal sealing and bearing surface extending outward from a bottom edge of the second side vertical sealing and bearing surface and away from an outboard side of the second side wall;

a seal holder flange integral with the outboard side of the first side of the first side wall below the first side downwardly facing sealing and bearing surface and including a seal base receiver passage and a seal blade passage;

a floor slat seal having a seal base and a seal blade with the seal base received in the seal base receiver passage and the seal blade extending through the seal blade passage and laterally outward away from the outboard side of the first side wall; and a seal contact flange, with an upwardly facing seal contact surface, integral with the second side wall and extending laterally outward from the outboard side of the second side wall.

* * * * *